US010897858B2

(12) United States Patent
Hoffman et al.

(10) Patent No.: US 10,897,858 B2
(45) Date of Patent: Jan. 26, 2021

(54) BLOWER/MULCHER

(71) Applicant: TTI (MACAO COMMERCIAL OFFSHORE) LIMITED, Macau (MO)

(72) Inventors: Ronald J. Hoffman, Iva, SC (US); Lance A. Eckard, Anderson, SC (US)

(73) Assignee: TTI (MACAO COMMERCIAL OFFSHORE) LIMITED, Macau (MO)

(*) Notice: Subject to any disclaimer, the term of this patent is extended or adjusted under 35 U.S.C. 154(b) by 295 days.

(21) Appl. No.: 16/203,247

(22) Filed: Nov. 28, 2018

(65) Prior Publication Data

US 2019/0159409 A1 May 30, 2019

Related U.S. Application Data

(60) Provisional application No. 62/593,145, filed on Nov. 30, 2017.

(51) Int. Cl.
*A01G 20/47* (2018.01)
*A47L 5/24* (2006.01)
(Continued)

(52) U.S. Cl.
CPC .............. *A01G 20/47* (2018.02); *A47L 5/24* (2013.01); *F04D 19/007* (2013.01);
(Continued)

(58) Field of Classification Search
CPC ... A01G 20/47; A47L 5/14; A47L 5/24; B65F 2240/138; F04D 19/007; F04D 27/005
See application file for complete search history.

(56) References Cited

U.S. PATENT DOCUMENTS 6,464,459 B2   10/2002   Illingworth
6,497,553 B2   12/2002   Illingworth et al.
(Continued)

FOREIGN PATENT DOCUMENTS

CA    2389346 A1   5/2001
CA    2343434 C    3/2010
(Continued)

OTHER PUBLICATIONS

European Patent Office Search Report for Application No. 18209290.8, dated Apr. 10, 2019, 5 pages.

*Primary Examiner* — Marc Carlson
(74) *Attorney, Agent, or Firm* — Michael Best & Friedrich LLP

(57) ABSTRACT

An air-flow generating device, such as a blower, a vacuum, a mulcher, etc. The device may include a motor, a housing that supports the motor, and a passageway coupled to the housing and defining a passageway axis between a first opening and a second opening. The device may also include a fan assembly with a first axial fan and a second axial fan, and a transmission assembly coupling the first axial fan and the second axial fan to the motor. The transmission assembly may include a transmission shaft rotatable about a transmission axis substantially orthogonal to the passageway axis. An actuator may be operable to adjust the fan assembly about the transmission axis between a first condition, in which the first axial fan is positioned proximate the first opening, and a second condition, in which the second axial fan is positioned proximate the first opening.

20 Claims, 14 Drawing Sheets

(51) Int. Cl.
 *F04D 27/00* (2006.01)
 *F04D 19/00* (2006.01)
 *A47L 5/14* (2006.01)

(52) U.S. Cl.
 CPC .............. *F04D 27/005* (2013.01); *A47L 5/14* (2013.01); *B65F 2240/138* (2013.01)

(56) References Cited

U.S. PATENT DOCUMENTS

| | | |
|---|---|---|
| 6,520,449 B2 | 2/2003 | Illingworth |
| 6,543,726 B2 | 4/2003 | Illingworth |
| 6,565,321 B1 | 5/2003 | Illingworth et al. |
| 6,595,753 B1 | 7/2003 | Illingworth et al. |
| 6,616,094 B2 | 9/2003 | Illingworth |
| 6,619,922 B2 | 9/2003 | Illingworth et al. |
| 6,623,352 B2 | 9/2003 | Illingworth |
| 6,687,951 B2 | 2/2004 | Illingworth et al. |
| 6,689,225 B2 | 2/2004 | Illingworth |
| 6,719,830 B2 | 4/2004 | Illingworth et al. |
| 6,729,839 B1 | 5/2004 | Illingworth et al. |
| 6,802,693 B2 | 10/2004 | Reinfeld et al. |
| 6,802,881 B2 | 10/2004 | Illingworth et al. |
| 6,811,687 B2 | 11/2004 | Illingworth |
| 6,881,025 B2 | 4/2005 | Illingworth et al. |
| 6,957,472 B2 | 10/2005 | Illingworth et al. |
| 6,960,063 B2 | 11/2005 | Reinfeld et al. |
| 7,143,468 B2 | 12/2006 | Illingworth et al. |
| 7,600,290 B1 | 10/2009 | Peters |
| 2002/0148069 A1 | 10/2002 | Illingworth |
| 2002/0155002 A1 | 10/2002 | Reinfeld et al. |
| 2002/0176777 A1 | 11/2002 | Reinfeld et al. |
| 2002/0176778 A1 | 11/2002 | Reinfeld et al. |
| 2002/0182077 A1 | 12/2002 | Reinfeld et al. |
| 2002/0182078 A1 | 12/2002 | Reinfeld et al. |
| 2003/0136094 A1 | 7/2003 | Illingworth et al. |
| 2003/0150198 A1 | 8/2003 | Illingworth et al. |
| 2003/0167741 A1 | 9/2003 | Illingworth et al. |
| 2004/0018089 A1 | 1/2004 | Illingworth et al. |
| 2004/0091357 A1 | 5/2004 | Reinfeld et al. |
| 2004/0139709 A1 | 7/2004 | Illingworth et al. |
| 2004/0139710 A1 | 7/2004 | Illingworth et al. |
| 2013/0206172 A1 | 8/2013 | Bjar et al. |
| 2016/0157686 A1* | 6/2016 | Bermudez ............. A01G 20/43 15/330 |
| 2016/0195097 A1* | 7/2016 | Patrick ................. F04D 29/542 415/124.2 |
| 2016/0324380 A1* | 11/2016 | Sergyeyenko ......... A01G 20/47 |
| 2017/0325642 A1* | 11/2017 | Gao ...................... E01H 1/0863 |
| 2018/0140146 A1* | 5/2018 | Zhu ...................... F04D 29/545 |
| 2019/0159409 A1* | 5/2019 | Hoffman ............... F04D 19/007 |

FOREIGN PATENT DOCUMENTS

| | | |
|---|---|---|
| CA | 2803700 A1 | 12/2011 |
| CA | 2960405 A1 | 12/2016 |
| CN | 103866725 B | 12/2016 |
| MX | 2012014618 A | 7/2013 |
| WO | WO-2016082759 A1 * | 6/2016 ........... F04D 25/084 |
| WO | 2016/201455 A1 | 12/2016 |

\* cited by examiner

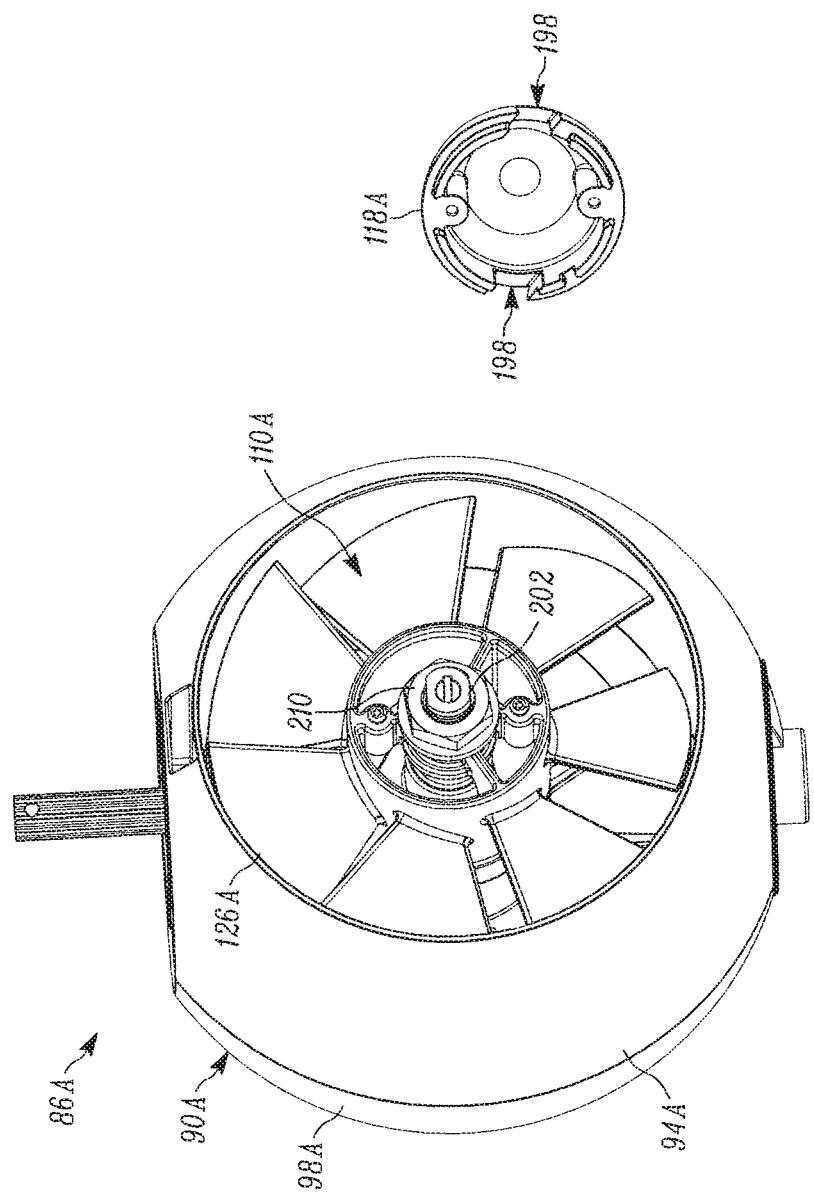

BLOWER/MULCHER

CROSS-REFERENCE TO RELATED APPLICATION

This application claims the benefit of co-pending, prior-filed U.S. Provisional Patent Application No. 62/593,145, filed Nov. 30, 2017, the entire contents of which are incorporated by reference.

FIELD

The present invention relates to an outdoor tool, such as a blower, a vacuum and/or a mulcher and, more particularly, to a fan assembly for use in a blower/mulcher.

SUMMARY

In one independent aspect, an outdoor tool, such as an air flow-generating device (e.g., a blower, a vacuum, a mulcher, etc.) may generally include a motor; a housing supporting the motor; a passageway coupled to the housing and defining a passageway axis between a first opening and a second opening; a fan assembly including a first axial fan having a first plurality of blades extending radially outwardly from a first hub, and a second axial fan having a second plurality of blades extending radially outwardly from a second hub; a transmission assembly operably coupling the first axial fan and the second axial fan to the motor, the transmission assembly including a transmission shaft rotatable about a transmission axis, the transmission axis being substantially orthogonal to the passageway axis; and an actuator operable to pivot the fan assembly about the transmission axis between a first condition, in which the first axial fan is positioned proximate the first opening, and a second condition, in which the second axial fan is positioned proximate the first opening.

In another independent aspect, a blower may generally include a passageway defining a passageway axis extending between a first opening and a second opening; a fan assembly positioned in the passageway and including a first axial fan, a first shaft having a first driven gear and coupled to the first axial fan, a second axial fan, a second shaft having a second driven gear and coupled to the second axial fan; a housing coupled to the passageway; a motor supported by the housing; and a transmission coupled to the motor and operably coupled to the first axial fan and the second axial fan, the transmission including a transmission shaft extending from the housing to the passageway along a transmission axis, the transmission axis being substantially orthogonal to the passageway axis, the transmission shaft including a drive gear meshing with the first driven gear and the second driven gear, rotating the drive gear causing the first driven gear, the first shaft and the first axial fan to rotate in a first direction about the passageway axis and the second driven gear the second shaft, and the second axial fan to rotate in an opposite, second direction about the passageway axis. The fan assembly may be rotatable about the transmission axis to displace the first axial fan and the second axial fan one-half revolution.

In yet another independent aspect, a method for operating an air-flow generating device may be provided. The device may include a housing defining a passageway extending along a passageway axis between a first opening and a second opening, a motor supported by the housing, a fan assembly driven by the motor and operable to cause flow through the passageway, the fan assembly including a first axial fan and a second axial fan, a transmission operably coupling the first axial fan and the second axial fan to the motor, the transmission including a transmission shaft rotatable about a transmission axis, the transmission axis being substantially perpendicular to the passageway axis, and an actuator operably coupled to the fan assembly.

The method may generally include, in a first condition, operating the fan assembly by rotating the first axial fan and the second axial fan about the passageway axis to cause flow through the passageway in a first direction from the second opening toward the first opening; operating the actuator to adjust the fan assembly to a second condition; and, in the second condition, operating the fan assembly by rotating the first axial fan and the second axial fan about the passageway axis to cause flow through the passageway in a second direction from the first opening toward the second opening.

Other independent aspects of the invention may become apparent by consideration of the detailed description, claims and accompanying drawings.

BRIEF DESCRIPTION OF THE DRAWINGS

FIG. 14 is a partial exploded view of the fan assembly of FIG. 13, illustrating a shaft.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

FIGS. 1-10 generally illustrate an outdoor tool, such as an air-flow generating device (e.g., a blower, a vacuum and/or a mulcher), and an adjustable fan assembly for such a tool. The fan assembly is adjustable (e.g., pivotable) to change a direction of air flow in the tool. With the adjustable fan assembly, the tool may provide a combination blower and mulcher/vacuum (e.g., a blower/mulcher 10).

Figure 1:
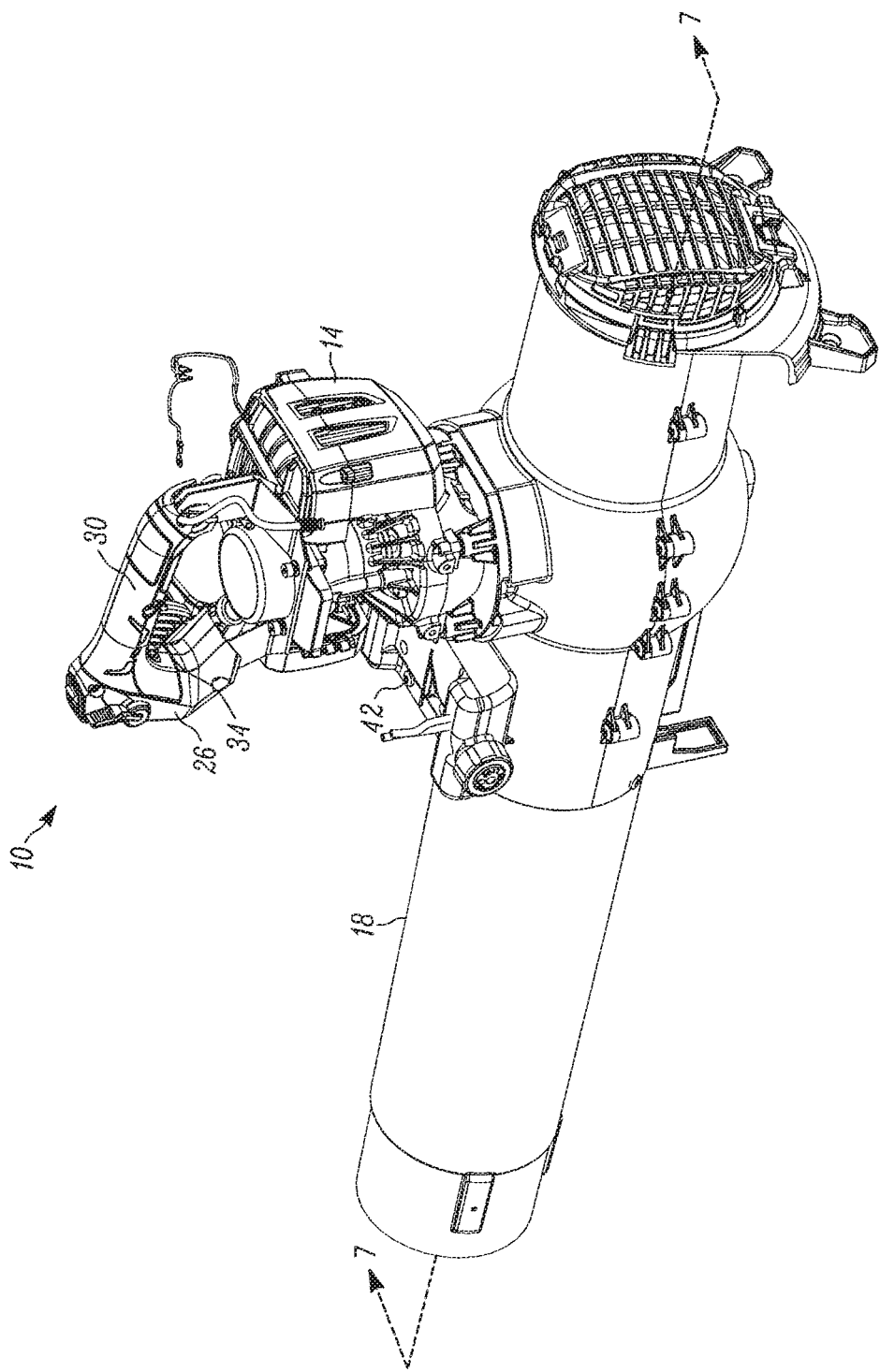
FIG. 1 is a perspective view of an outdoor tool, such as a blower/mulcher, illustrated in a first condition.

As shown in FIG. 1, the blower/mulcher 10 includes a housing 14 and a passageway 18. The housing 14 supports a power unit assembly including a motor 22 (see FIG. 8). The motor 22 is operable to power to the blower/mulcher 10 and, in the illustrated embodiment, includes an internal combustion engine. In other constructions (not shown), the motor can be powered by different means (e.g., an electrical power source). A handle 26 extends outwardly from the housing 14 and includes a grip 30 having a trigger 34 operably connected to the motor 22.

In use, the blower/mulcher 10 is normally oriented with the housing 14 substantially above the passageway 18 and with the handle 26 at the top. The housing 14 is coupled to the passageway 18 by inter-engaging members on the housing 14 (not shown) and on the passageway (members 38 (see FIG. 2)). A fastener 42 (e.g., a screw or a bolt) is inserted through each pair of members to connect the housing 14 and the passageway 18.

Figure 2:
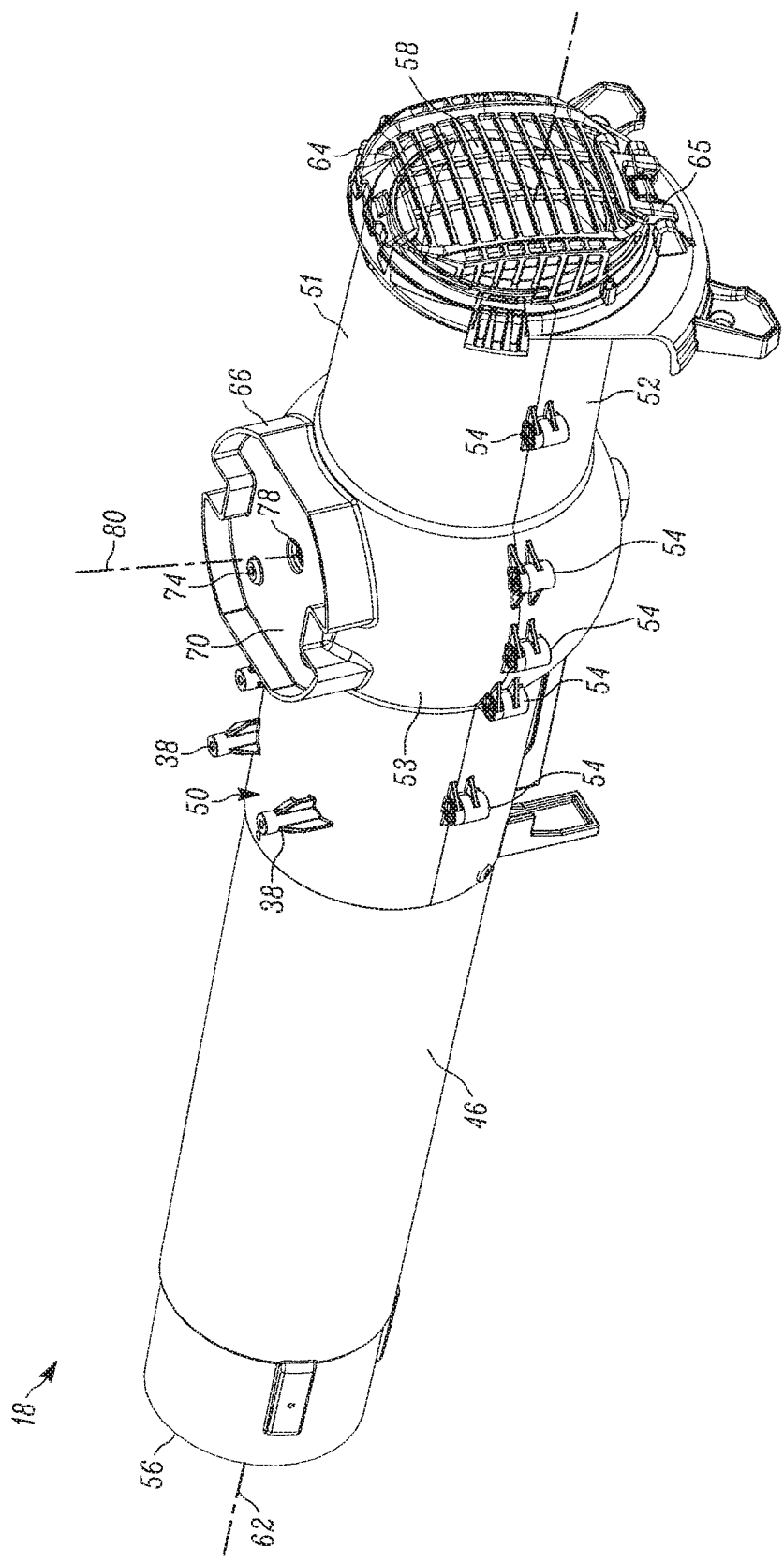
FIG. 2 is a perspective view of a passageway of the blower of FIG. 1.

As shown in FIG. 2, the passageway 18 includes a substantially cylindrical first passageway section 46 and a second passageway section 50. The second passageway 50 has a first half 51 and a second half 52 coupled by fasteners (not shown) inserted through securing members 54. The second passageway section 50 is generally cylindrical in shape and has a spherical center section 53. The first passageway section 46 and the second passageway section 50 are hollow and extend between a first opening 56, at the end of the first section 46, and a second opening 58, at the end of the second section 50, generally centered on a passageway axis 62. The illustrated openings 54 and 58 are substantially circular.

The diameter of the first passageway section 46 is less than the diameter of the second passageway section 50, and the end of the first passageway section 46 opposite the first opening 56 nests inside the end of the second passageway section 50 opposite the second opening 58. Apertures (not shown) in the first passageway section 46 and the second half 52 of the second passageway section 50 align when the end of the first passageway section 46 is nested. A fastener (e.g. a screw or a bolt) is inserted through the apertures to secure the passageway sections 46, 50.

A door 64 is movably coupled to the second opening 58 (e.g., pivotably by a hinge 65). The door 64 has a plurality of openings which provide fluid communication between the passageway 18 and the environment. The illustrated door 64 can pivot relative the passageway 18 to fully open the second opening 58. In other constructions (not shown), the door 64 can be coupled to the passageway 18 in other manners (e.g., removably, for sliding movement, etc.).

Figure 8:
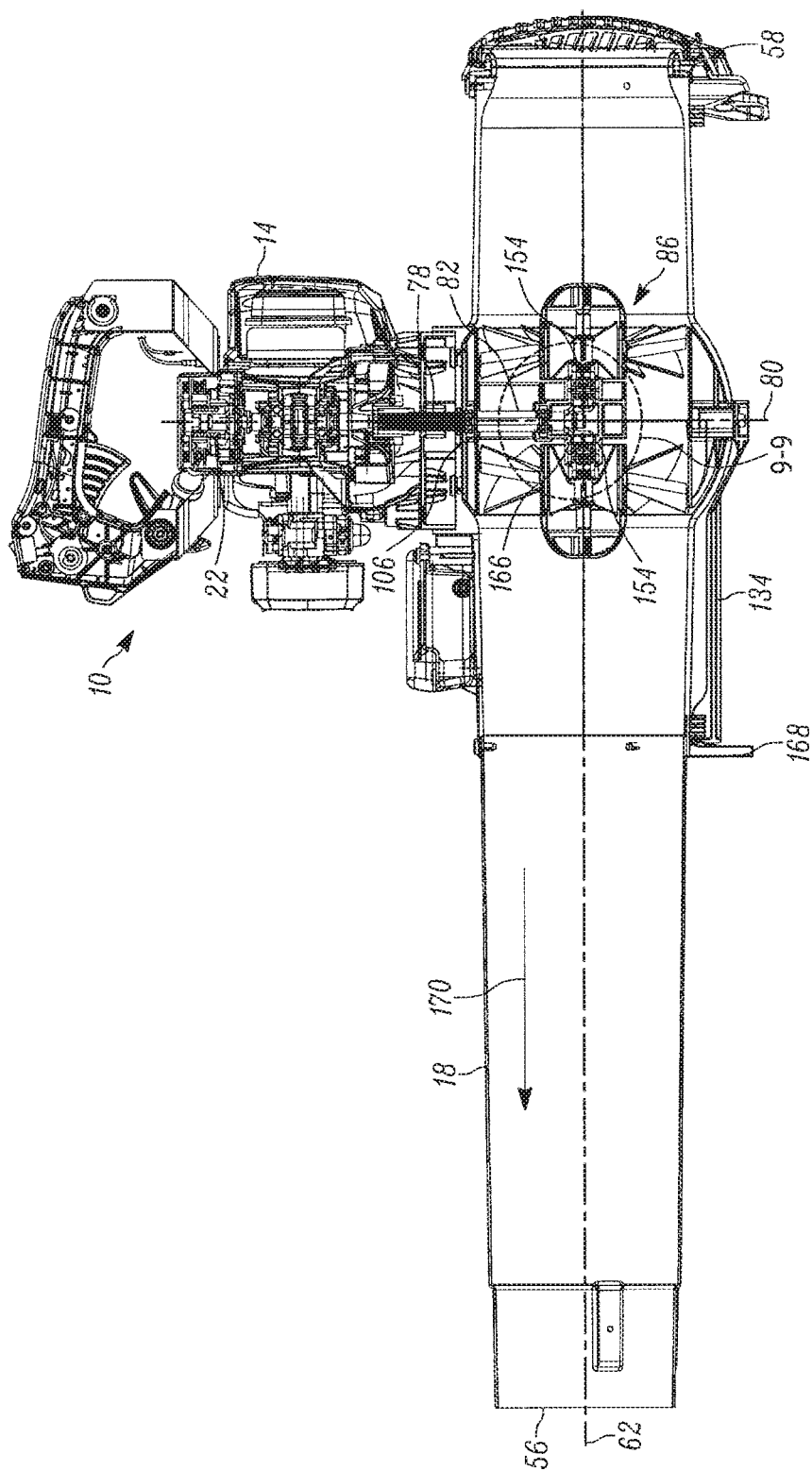
FIG. 8 is a cross-sectional side view of the blower of FIG. 1 generally taken generally along line 7-7.

The first half 51 of the second passageway section 50 has a mounting portion 66 adjacent the spherical center section 53. The mounting portion 66 has a substantially flat surface 70 abutting with the housing 14 for coupling with the passageway 18. A securing aperture 74 is configured to receive a securing member (not shown) as an additional means to couple the housing 14 to the passageway 18. A transmission aperture 78 extends through the flat surface 70 into the spherical center section 53 along a transmission axis 80 and is configured to receive a transmission shaft 82 (FIG. 8). The diameter of the aperture 78 is larger than the diameter of the shaft 82 so that the shaft 82 can move in the aperture 78.

Figure 3:
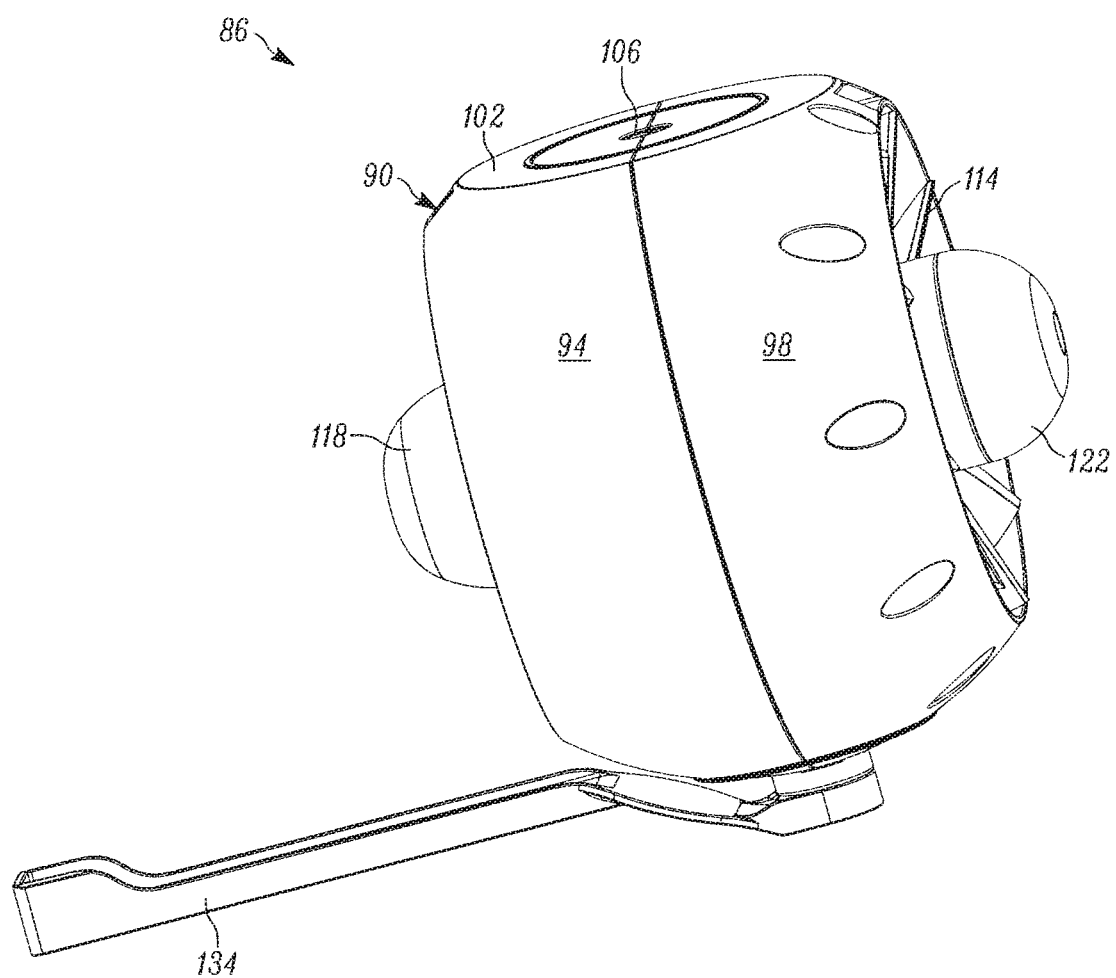
FIG. 3 is a perspective view of a fan assembly.

FIG. 3 illustrates a fan assembly 86 having a substantially spherical in shape to allow the fan assembly 86 to fit inside of the spherical section 53 of the passageway 18 (FIG. 2). The fan assembly 86 includes a fan housing 90 with a first housing section 94 and a second housing section 98 coupled together with fasteners (not shown) in a direction parallel the passageway axis 62 (FIG. 2).

Figure 7:
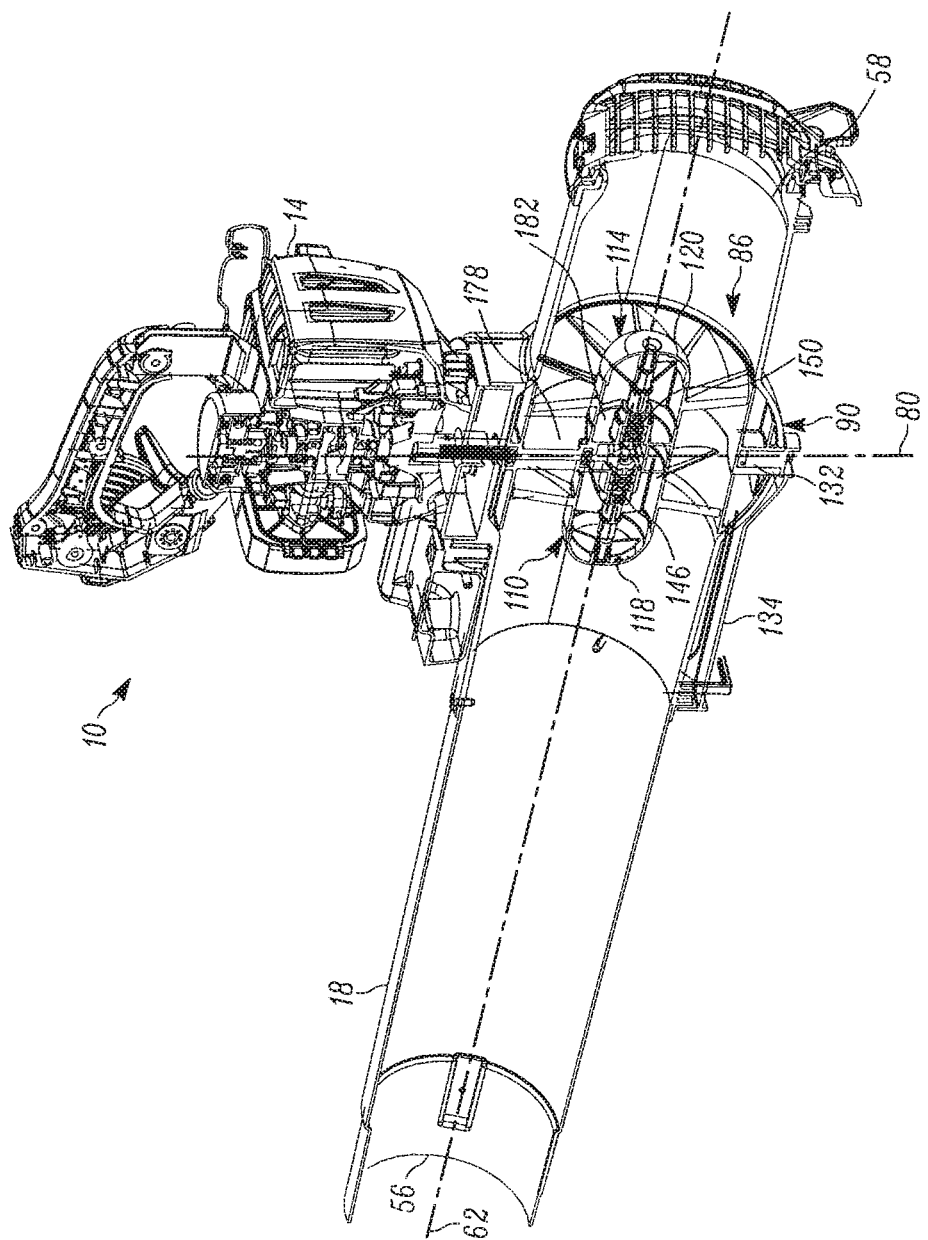
FIG. 7 is a cross-sectional perspective view of the blower of FIG. 1 generally taken generally along line 7-7.

An upper surface 102 at the interface of the housing sections 94, 98 is oriented proximate the first half 51 of the second passageway section 50 (FIG. 7). An aperture 106 extends through the surface 102 into the fan housing 90, is aligned with the transmission aperture 70 (FIG. 2) and is configured to accept the transmission shaft 82 (FIG. 8). The diameter of the aperture 106 is also larger than the diameter of the shaft 82 to allow movement.

Figure 4:
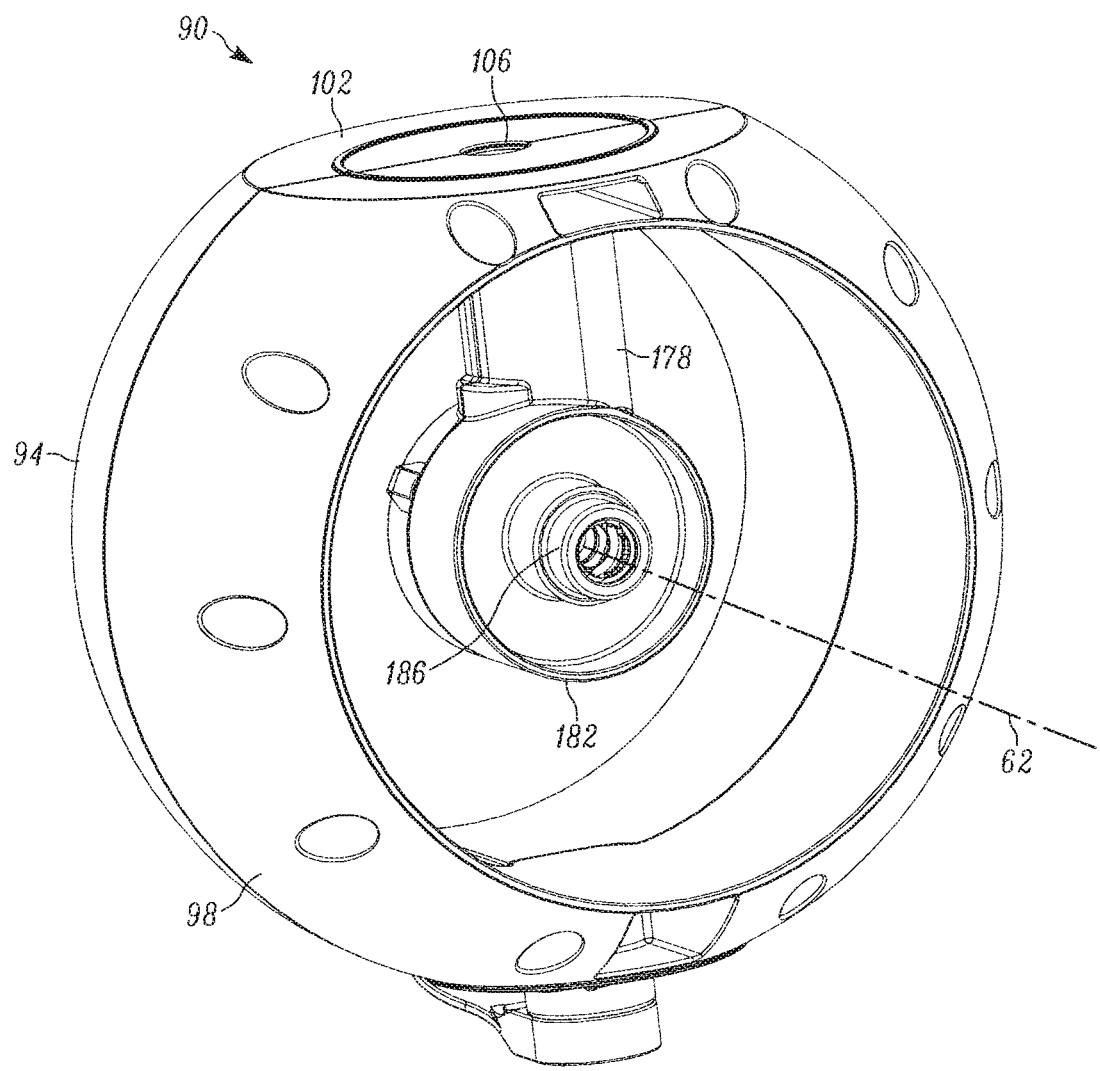
FIG. 4 is a perspective view of the fan housing.

As shown in FIG. 4, the fan housing 90 includes a support member or stator 178 as a "stationary" blade (e.g., does not rotate during operation of the fans 110, 114) that supports the first fan 110 and the second fan 114. The stator 178 extends from an inner surface of the housing sections 94, 98 to a central support member 182. The illustrated central support member 182 is cylindrical and includes a projection 186 which extends along the passageway axis 62.

The stator 178 defines a passageway 184 (FIG. 9) for the shaft 82 communicating into the support member 182. The illustrated stator 178 extends at an angle to the passageway axis 62. The illustrated passageway 180 is at the midpoint of the stator 178, is aligned with the apertures 70, 106 and intersects the passageway axis 62. In alternate embodiments (not shown), the fan housing 90 can include multiple stators 178.

Figure 5:
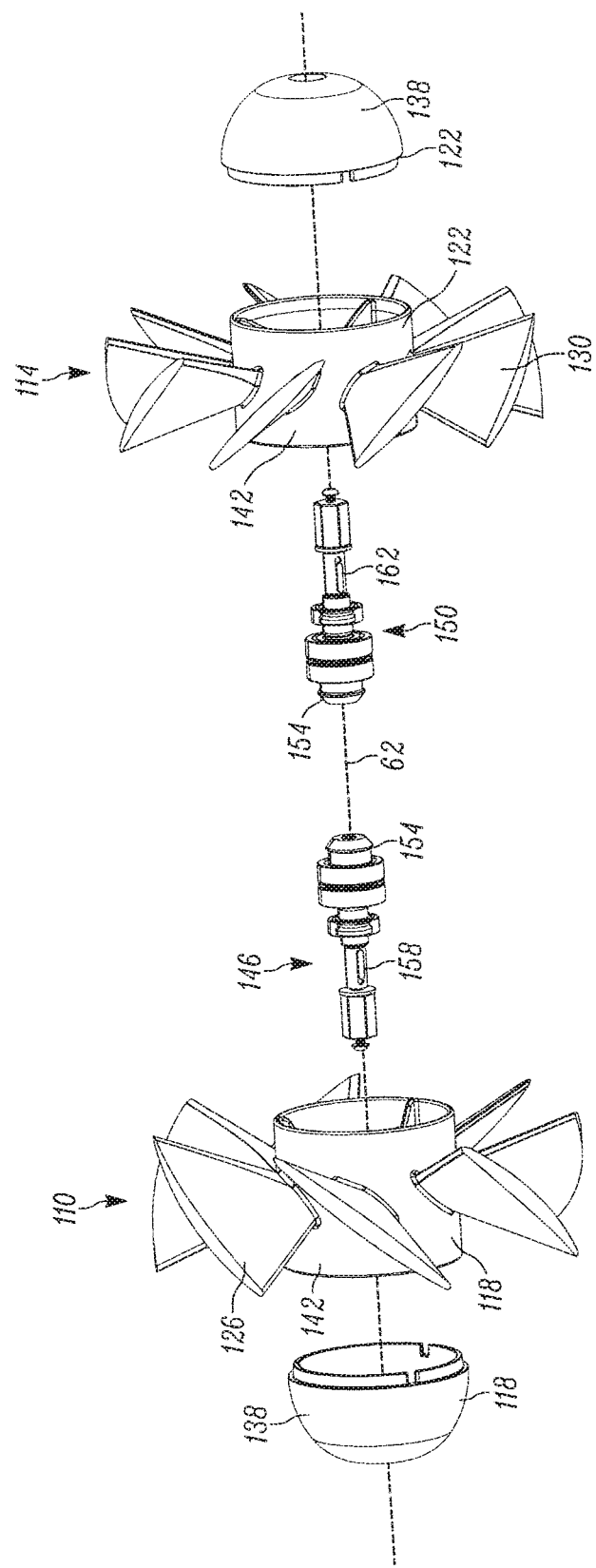
FIG. 5 is an exploded perspective view of a first axial fan and a second axial fan.

The fan assembly 86 also includes (see FIG. 5) a first axial fan 110 and a second axial fan 114 positioned inside the fan housing 90 and operable rotate around the passageway axis 62 (FIG. 2) to generate an air flow in the passageway 18. Each fan 110, 114 has a hub 118, 122 with a rounded shape. First blades 126 and second blades 130 extend radially outwardly from the first hub 118 and the second hub 122, respectively (FIG. 5). As shown in FIG. 5, each fan hub 118, 122 includes a hemispherical end cap 138. The end caps 138 (see FIG. 3) extend past the fan housing 90. Including the end caps 138, the fan assembly 86 (FIG. 3) generally has a spherical extent.

The first blades 126 and the second blades 130 extend outwardly from a hollow cylindrical portion 142 of the hubs 118, 122, respectively. In the illustrated embodiment, the first fan 110 has fewer blades 126 than the second fan 114. In alternate embodiments (not shown), the first fan 110 may have the same number of or more blades 126 than the second fan 114.

Figure 6:
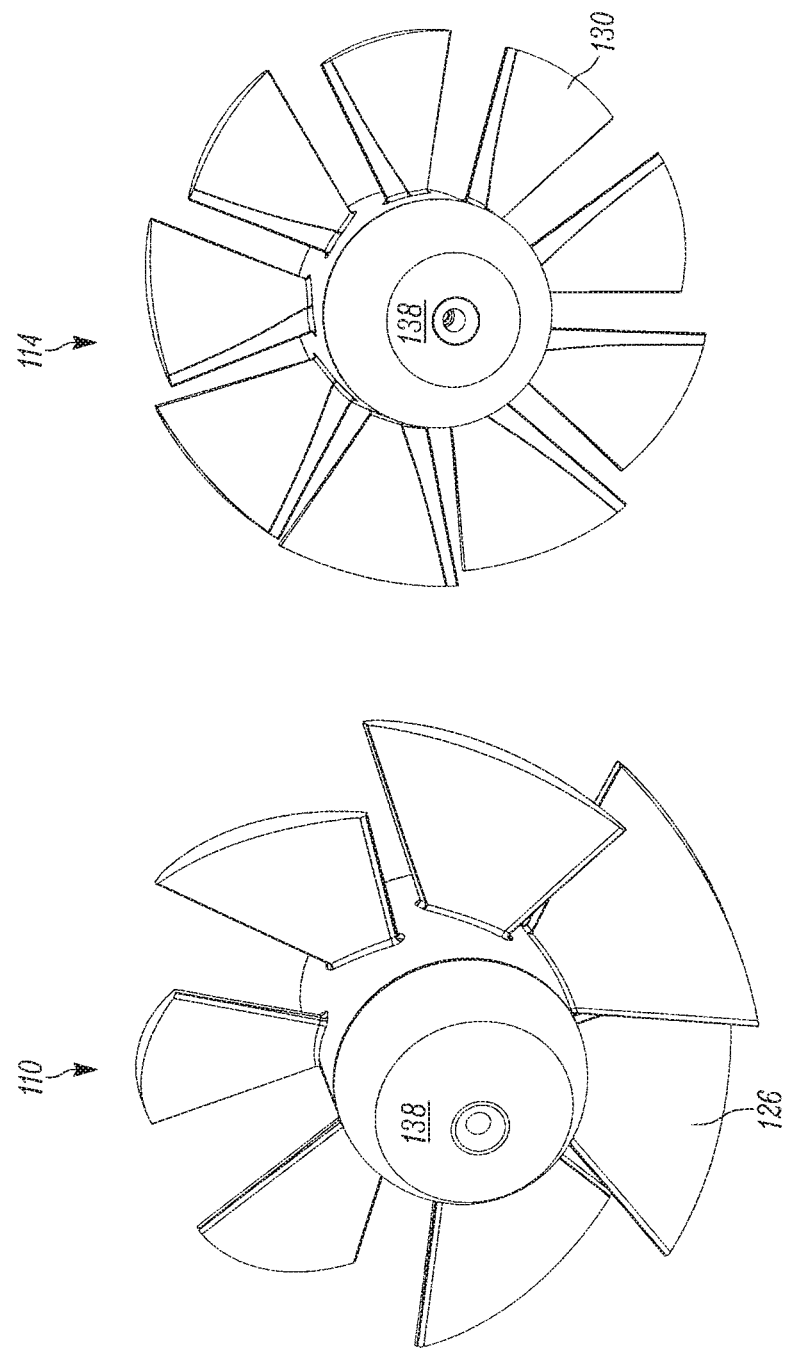
FIG. 6 is a perspective view of the first axial fan and the second axial fan of FIG. 4.

As shown in FIG. 6, each first blade 126 is larger than each second blade 130. Each blade 126, 130 extends towards the associated end cap 138. The first blades 126 are angled in a first direction from a center of the first hub 118, and the second blades 130 are oriented in an opposite second direction from a center of the second hub 122. Each fan 110, 114 is directed toward one opening 56, 58 (FIG. 8).

Figure 9:
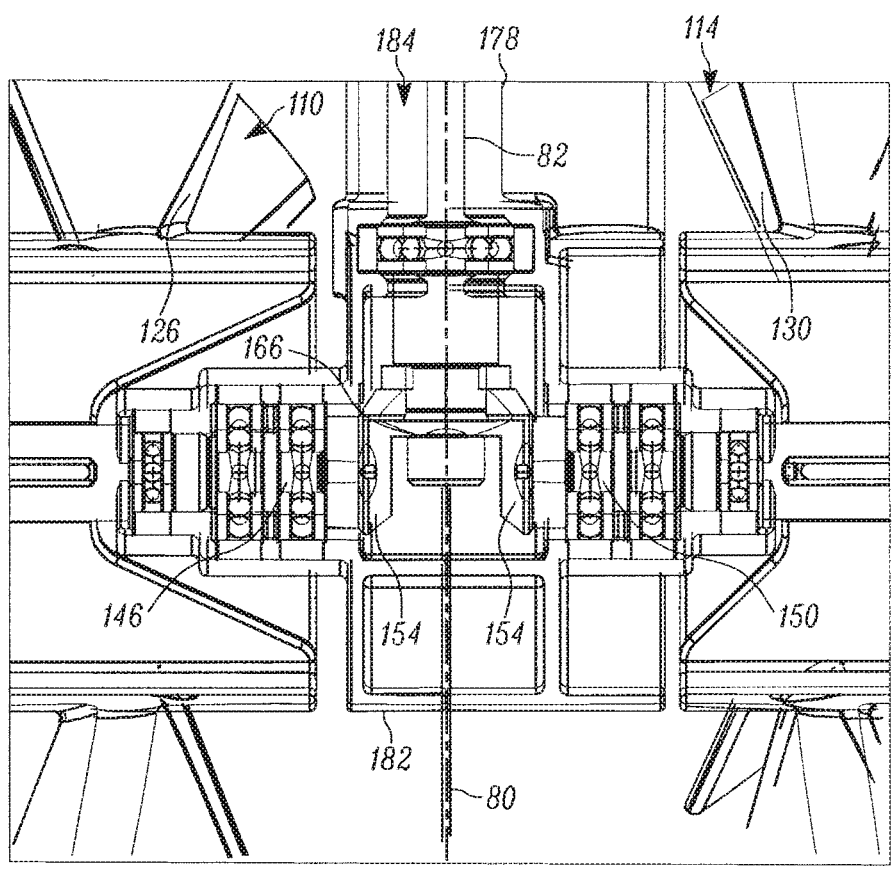
FIG. 9 is an enlarged view of a portion of the blower of FIG. 6 generally taken generally along line 9-9.
Figure 10:
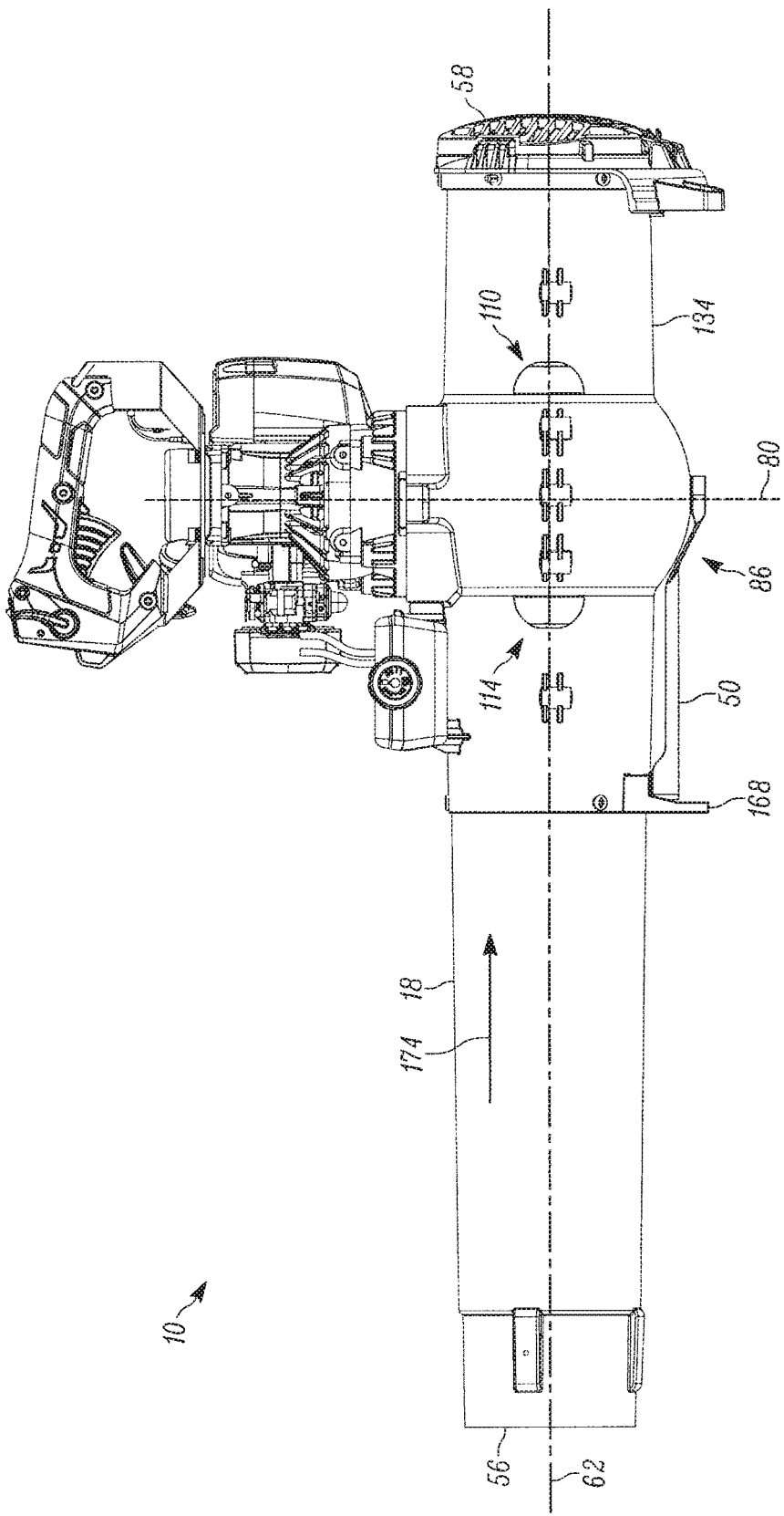
FIG. 10 is a side view of the blower of FIG. 1 in a second condition.

As shown in FIG. 7, a first fan shaft 146 and a second fan shaft 150 extend from an area inside of the central support member 182, through the projections 186 (FIG. 4), and to the hubs 118, 122, respectively. The first fan shaft 146 couples the first fan 110 to the central support member 182 and the second fan shaft 150 couples the second fan 114 to the central support member 182. The first fan 110 and the second fan 114 are spaced apart from the central support member 182 (FIG. 9). Each fan shaft 146, 150 include a gear 154 (FIG. 8), and the gears 154 are arranged proximate each other on opposite sides of the transmission axis 80 (FIG. 7). The opposite end 158, 162 (FIG. 5) of each fan shaft 146, 150 couples to the associated hub 118, 122. The fan shafts 146, 150 and the respective gears 154 rotate about the passageway axis 62.

As shown in FIG. 8, the transmission shaft 82 couples to the motor 22 and extends from the housing 14, through the apertures 78, 106, and into the fan assembly 86. The transmission shaft 82 extends along the transmission axis 80 and is substantially perpendicular to the passageway axis 62 and the axis of the shafts 146, 150.

A drive gear 166 is supported on the end of the transmission shaft 82 opposite the motor 22 and meshes with the driven gears 154 to define a gear set. As shown in FIG. 7, the gear 166 and the gears 154 are bevel gears having tapered surfaces. The taper of the gear 166 extends away from the housing 14 (FIG. 8) and is uniform about the transmission axis 80. The taper in each of the gears 154 extends away from the associated axial fan 110, 114 and is uniform about the passageway axis 62. The tapered surfaces allow a drive gear 166 to transfer energy to driven gears 154 oriented orthogonally from the drive gear 166. Rotation of the motor 22 causes rotation of the transmission shaft 82, and rotation of the transmission shaft 82 causes rotation of the shafts 146, 150 and the fans 110, 114.

The drive gear 166 causes the driven gears 154 to rotate in opposite directions. Each driven gear 154 has a different shaft 146, 150 located on opposite sides of the transmission axis 80. In this configuration, rotation of the drive gear 166 will cause one driven gear 154 to rotate (when viewed from the first opening 56) in a clockwise direction and the other driven gear 154 to rotate in a counter-clockwise direction. Rotation of the driven gears 154 in opposite directions causes the first axial fan 110 and the second axial fan 114 to counter-rotate (i.e., rotate in opposite directions with respect to one another).

Because the first blades 126 are oriented opposite the second blades 130, one fan 110, 114 rotates in a forward direction (e.g., air is pushed over the end cap 138 (FIG. 6)) and the other fan 110, 114 rotates in a reverse direction (e.g., air is suctioned over the end cap 138). In the illustrated embodiment, the first axial fan 110 rotates in the forward direction, and the second axial fan 114 rotates in the reverse direction. Because the end caps 138 of the fans 110, 114 face in substantially opposite directions, both fans 110, 114 direct air in the same direction along the passageway axis 62.

As shown in FIGS. 7 and 8, an adjustment assembly is operable to adjust (e.g., pivot) the fan assembly 86 to change a direction of air flow in the passageway 18. The adjustment assembly includes an actuator coupled (e.g., positively and/or frictionally) to the fan housing 90 opposite the upper surface 102 for movement therewith.

In the illustrated embodiment, the actuator includes a post 132 extending through the passageway half 52 to engage the fan housing 90. In the illustrated construction, the post 132 and the fan housing 90 have inter-engaging structure (e.g., a non-coaxial and/or non-circular shape such as a star-shape, a square-shape, an eccentric-shape, etc.) to positively connect the actuator and the fan housing 90 and a fastener to provide frictional engagement. The actuator also includes an arm 134 connected to the post 132 and pivotable relative to the passageway 18 to cause pivoting movement of the fan assembly 86 about the transmission axis 80.

The arm 134 extends parallel to the passageway axis 62 along an exterior of the passageway 18. The arm 134 extends between a pair of retainers 168 operable to prevent the arm 134 (and the fan assembly 86) from pivoting about the transmission axis 80. The position of the arm 134 defines a condition or configuration of the blower/mulcher 10.

In one condition (e.g., a blower condition), the first axial fan 110 is directed towards the first opening 56, and the second axial fan 114 is directed towards the second opening 58. In this condition, the second axial fan 114 draws air into the passageway 18 through the second opening 58, and the first axial fan 110 pushes air out of the passageway 18 through the first opening 56. This defines a first air direction 170 from the second opening 58, along the passageway axis 62, and through the first opening 56. In this condition, the end of the arm 134 extends toward the first opening 56, the outlet in this configuration.

The arm 134 is pivotable 180 degrees about the transmission axis 80 to a second condition (e.g., a vacuum or mulcher condition) of the blower/mulcher 10. In this condition, the first axial fan 110 is directed towards the second opening 58, and the second axial fan 114 is directed towards the first opening. In this condition, the second axial fan 114 draws air into the passageway 18 through the first opening 56, and the first axial fan 110 pushes air out of the passageway 18 through the second opening 58. This defines a second air direction 174 from the first opening 56, along the passageway axis 62, and through the second opening 58. In this condition, the end of the arm 134 extends toward the second opening 58, the outlet in this configuration.

The arm 134 can pivot in either a clockwise or counterclockwise direction. To pivot the arm 134, the retainer 168 pivots from a locked position towards the passageway 18 into an unlocked position where the retainer is adjacent the second passageway section 50. This allows the arm 134 a freedom of movement about the transmission axis 80 to the other position in which the retainer 168 then retains the arm 134 and inhibits pivoting movement of the fan assembly 86.

In alternate embodiments (not shown), the arm 134 can pivot more than 180 degrees (e.g., 360 degrees or more) between the configurations. In still other embodiments (not shown), the blower/mulcher 10 may be constructed so that the arm 134 pivots less than 180 degrees between the conditions.

In the blower condition (FIG. 8), air flows out of the first opening 56 and into the environment outside of the passageway 18. This flow of air contacts debris (e.g. leaves) proximate the first opening 56 and directs them along the first air direction 170. In the mulcher condition (FIG. 10), air flows into the first opening 56 from the environment outside of the passageway 18. This flow of air suctions debris (e.g. leaves) proximate the first opening 56 and directs them along the second air direction 174.

In the mulcher condition, debris that enters the passageway 18 passes through and is contacted by the second blades 130. Having more second blades 130 than first blades 126 allows the second fan 114 to break up debris into smaller pieces than the first fan 110. The debris passes through the second opening 58 after it passes through the fans 110, 114. A collector (e.g., a bag or other container (not shown)) can be coupled to the second opening 58 when the door 64 is adjusted to open the second opening 58. The collector retains the broken up debris.

FIGS. 11-14 illustrate an alternate embodiment of the fan assembly 86A. The fan assembly 86A is similar to the fan assembly 86 described above, and common elements have the same reference number "A".

Figure 11:
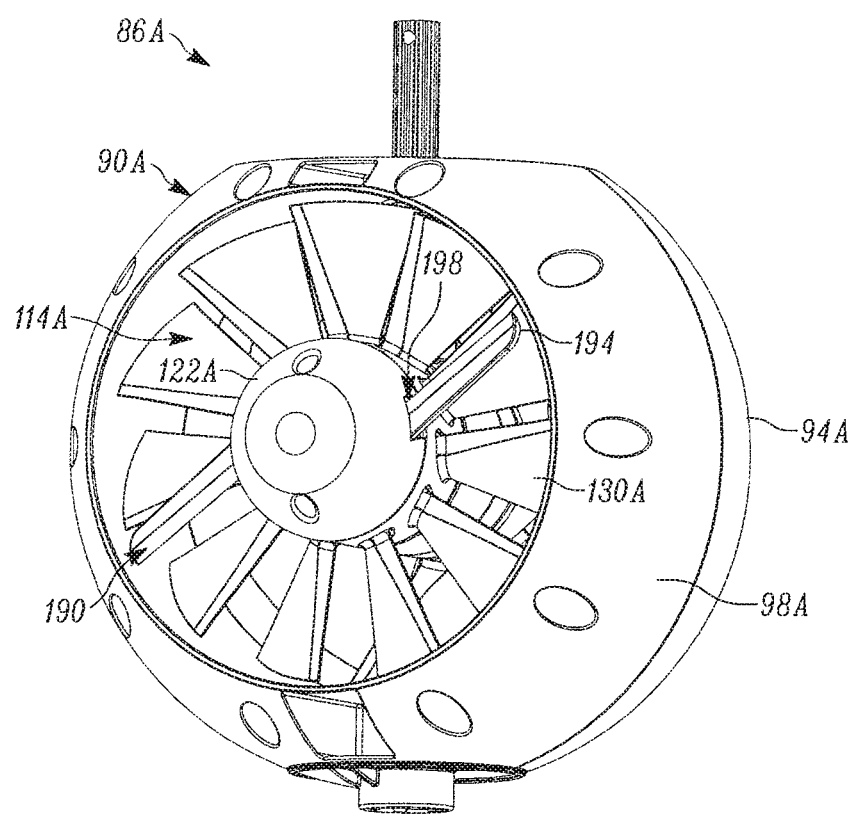
FIG. 11 is a perspective view of an alternate embodiment of a fan assembly.
Figure 12:
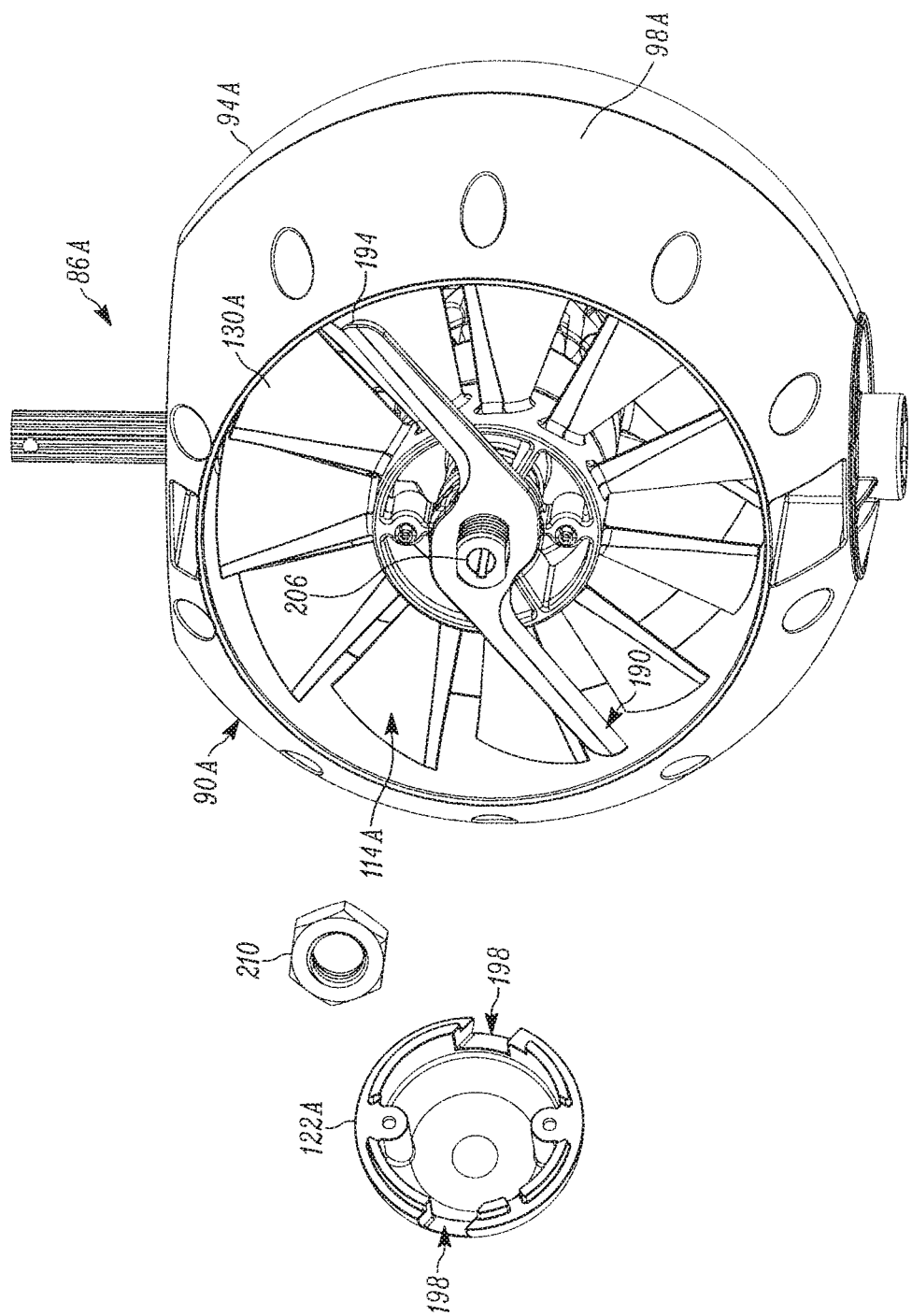
FIG. 12 is a partial exploded view of the fan assembly of FIG. 11, illustrating a chopper blade.

As shown in FIGS. 11-12, the fan assembly 86A includes at least one third fan or chopper 190. In the illustrated construction, the chopper 190 is positioned upstream (when in the second condition) of the second fan 114A. The chopper 190 has two blades 194 extending outwardly from slots 198 in the hub 122A. In the illustrated embodiment, the fan blades 126A, 130A are formed of plastic, and the chopper blades 194 are formed of metal. In the illustrated embodiment, chopper blades 194 are pitched proximate the shaft 206.

The chopper 190 is coupled to a shaft 206 (e.g., by a threaded nut 210). The shaft 206 is coupled to the second fan shaft 150 (FIG. 5) so that the chopper blades 194 rotate with the second fan blades 130A. When the blower 10 is in the mulcher condition, the chopper 190 faces the first opening 56 (FIG. 10), and the chopper blades 194 are the first fan blades that the suctioned debris encounter and contact. The rotating chopper 190 in front of the second fan blade 130A provides additional means to break up debris into smaller pieces while the blower 10 is in the mulcher condition. Additionally, incorporating the metal chopper 190 makes the plastic second fan blade 130A lighter and may reduce the time need to accelerate from idle to full speed.

Figure 13:
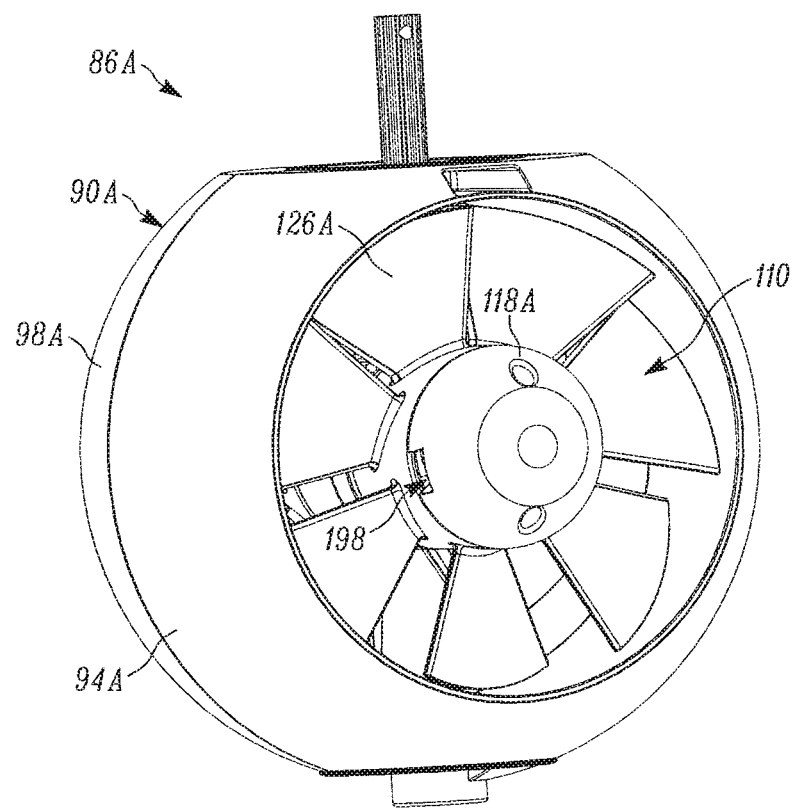
FIG. 13 is a perspective view of the fan assembly of FIG. 11, illustrating a rear side.

As shown in FIGS. 13-14, the hub 118A includes slots 198. In some constructions (not shown), the first fan 110A may include a chopper in front of the first fan blades 126A in addition to or as an alternative to the chopper 190 with the second fan 114A. The first blade chopper may couple to a shaft 202 and can be held in place by a nut 210. The shaft 202 is coupled to the first fan shaft 146 (FIG. 5) so that the chopper may rotate with the first fan blades 126A. The chopper blades of the first fan 110A may have a pitch opposite to the chopper blades 194 of the second fan 114A so that the chopper blades of the first fan 110A may further break up suctioned debris in the mulcher condition.

As illustrated, the single stator 178 is constructed to minimize obstacles in the passageway 18, allowing a significant majority of the passageway 18 to be clear for debris to travel therethrough. This allows more debris to more directly contact the fan blades 126, 130 and get broken up instead of contacting a stator 178 and not getting cut up.

The arm 134 adjusts the blower/mulcher 10 between the blower condition and the mulcher condition. Use of counter-rotating fans means that the transmission shaft 82 does not need to rotate in a different direction to switch between the blower condition and the mulcher condition. In other words, the transmission shaft 82 rotates in the same direction in the blower condition and in the mulcher condition. This configuration may provide a rapid way to change from the blower condition to the mulcher condition.

One or more independent features and/or independent advantages of the invention may be set forth in the claims.

What is claimed is:

1. An air-flow generating device comprising:
    a motor;
    a housing supporting the motor;
    a passageway coupled to the housing and defining a passageway axis between a first opening and a second opening;
    a fan assembly including
        a first axial fan having a first plurality of blades extending radially outwardly from a first hub, and
        a second axial fan having a second plurality of blades extending radially outwardly from a second hub;
    a transmission assembly operably coupling the first axial fan and the second axial fan to the motor, the transmission assembly including a transmission shaft rotatable about a transmission axis, the transmission axis being substantially orthogonal to the passageway axis; and
    an actuator operable to pivot the fan assembly about the transmission axis between a first condition, in which the first axial fan is positioned proximate the first opening, and a second condition, in which the second axial fan is positioned proximate the first opening.

2. The device of claim 1, wherein the device includes a mulcher, and wherein the fan assembly further includes a chopper blade coupled to the second hub to be positioned between the first opening and the second axial fan in the second condition.

3. The device of claim 1, wherein the fan assembly further includes
    a first shaft having a first driven gear coupled to the first axial fan, and
    a second shaft having a second driven gear coupled to the second axial fan,
    wherein the transmission shaft includes a drive gear meshing with the first driven gear and the second driven gear, rotation of the drive gear causing the first driven gear to rotate in a first direction and the second driven gear to rotate in a second direction opposite to the first direction.

4. The device of claim 1, further comprising a retainer coupled to an outer surface of the housing and operable between a locked position in which the retainer limits adjustment of the fan assembly between the first condition and the second condition, and an unlocked position, adjustment of the fan assembly is permitted.

5. The device of claim 1, wherein the first plurality of blades includes a first number of blades and the second plurality of blades includes a second number of blades different than the first number.

6. The device of claim 1, wherein, in the first condition, the fan assembly is operable to cause flow along the passageway from the second opening toward the first opening, and, wherein, in the second condition, the fan assembly is operable to cause flow along the passageway from the first opening toward the second opening.

7. The device of claim 1, wherein the transmission assembly further comprises a support member extending along the transmission axis and housing the transmission shaft.

8. The device of claim 1, wherein the passageway includes a cylindrical first section defining the first opening, a cylindrical second section defining the second opening, and a spherical section between the first section and the second section, the spherical section housing the fan assembly.

9. A blower comprising:
a passageway defining a passageway axis extending between a first opening and a second opening;
a fan assembly positioned in the passageway and including
a first axial fan,
a first shaft having a first driven gear and coupled to the first axial fan,
a second axial fan,
a second shaft having a second driven gear and coupled to the second axial fan;
a housing coupled to the passageway;
a motor supported by the housing; and
a transmission coupled to the motor and operably coupled to the first axial fan and the second axial fan, the transmission including
a transmission shaft extending from the housing to the passageway along a transmission axis, the transmission axis being substantially orthogonal to the passageway axis, the transmission shaft including a drive gear meshing with the first driven gear and the second driven gear, rotating the drive gear causing the first driven gear, the first shaft and the first axial fan to rotate in a first direction about the passageway axis and the second driven gear the second shaft, and the second axial fan to rotate in an opposite, second direction about the passageway axis;
wherein the fan assembly is rotatable about the transmission axis to displace the first axial fan and the second axial fan one-half revolution.

10. The blower of claim 9, further comprising an arm operably coupled to the fan assembly and pivotable about the transmission axis to displace the fan assembly.

11. The blower of claim 10, further comprising a retainer adjustable between a locked position, in which the retainer limits the displacement of the fan assembly, and an unlocked position, in which displacement of the fan assembly is permitted.

12. The blower of claim 9, wherein the blower includes a blower/mulcher, and wherein the fan assembly further includes a chopper blade coupled to the second hub to be positioned between the first opening and the second axial fan in the second condition.

13. The blower of claim 9, wherein the first axial fan and the second axial fan are non-identical.

14. The blower of claim 9, wherein the fan assembly includes a first condition, in which the first axial fan is proximate the first opening and the fan assembly is operable to cause flow along the passageway from the second opening toward the first opening, and a second condition, in which the second axial fan is proximate the first opening and the fan assembly is operable to cause flow from the first opening toward the second opening.

15. A method for operating an air-flow generating device, the device including a housing defining a passageway extending along a passageway axis between a first opening and a second opening, a motor supported by the housing, a fan assembly driven by the motor and operable to cause flow through the passageway, the fan assembly including a first axial fan and a second axial fan, a transmission operably coupling the first axial fan and the second axial fan to the motor, the transmission including a transmission shaft rotatable about a transmission axis, the transmission axis being substantially perpendicular to the passageway axis, and an actuator operably coupled to the fan assembly, the method comprising:
in a first condition, operating the fan assembly by rotating the first axial fan and the second axial fan about the passageway axis to cause flow through the passageway in a first direction from the second opening toward the first opening;
operating the actuator to adjust the fan assembly to a second condition; and
in the second condition, operating the fan assembly by rotating the first axial fan and the second axial fan about the passageway axis to cause flow through the passageway in a second direction from the first opening toward the second opening.

16. The method of claim 15, wherein operating the fan assembly in the first condition includes rotating the first axial fan about the passageway axis in a first direction and rotating the second axial fan about the passageway axis in an opposite, second direction.

17. The method of claim 15, further comprising:
selectively retaining the movement of the actuator with a retainer coupled to an outer surface of the housing; and
adjusting the retainer between a locked position and an unlocked position, wherein the unlocked position permits the movement of the actuator to adjust fan assembly.

18. The method of claim 17, wherein operating the fan assembly in the first condition and operating the fan assembly in the second condition includes rotating the transmission shaft in the same direction about the transmission axis.

19. The method of claim 15, wherein operating the fan assembly in the first condition includes blowing debris away from the first opening.

20. The method of claim 15, wherein operating the fan assembly in the second condition includes suctioning debris into the first opening.

* * * * *